(12) United States Patent
Miyahara et al.

(10) Patent No.: US 11,865,499 B2
(45) Date of Patent: Jan. 9, 2024

(54) ZEOLITE MEMBRANE COMPLEX, METHOD OF PRODUCING ZEOLITE MEMBRANE COMPLEX, AND HYDROTHERMAL SYNTHESIS APPARATUS

(71) Applicant: NGK INSULATORS, LTD., Nagoya (JP)

(72) Inventors: Makoto Miyahara, Tajimi (JP); Kenichi Noda, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 296 days.

(21) Appl. No.: 17/177,402

(22) Filed: Feb. 17, 2021

(65) Prior Publication Data

US 2021/0275975 A1   Sep. 9, 2021

(30) Foreign Application Priority Data

Feb. 21, 2020  (JP) ................................. 2020-028180
Feb. 5, 2021  (JP) ................................. 2021-017178

(51) Int. Cl.
*B01D 71/02* (2006.01)
*B01D 69/02* (2006.01)
(Continued)

(52) U.S. Cl.
CPC ....... *B01D 71/028* (2013.01); *B01D 67/0051* (2013.01); *B01D 69/02* (2013.01);
(Continued)

(58) Field of Classification Search
CPC .. B01D 67/0051; B01D 71/028; B01D 69/10; B01D 69/02; B01D 2325/04; B01D 2323/12
See application file for complete search history.

(56) References Cited

U.S. PATENT DOCUMENTS

| | | |
|---|---|---|
| 2008/0047427 A1 | 2/2008 | Bitterlich et al. |
| 2009/0130000 A1 | 5/2009 | Inoue |
| 2017/0259214 A1* | 9/2017 | Onozuka ................ B01D 69/10 |

FOREIGN PATENT DOCUMENTS

| | | |
|---|---|---|
| CN | 1909953 A | 2/2007 |
| CN | 101193821 A | 6/2008 |

(Continued)

OTHER PUBLICATIONS

"Principles of Petroleum Processing Unit Processes," Chinese Petrochemical Press, 1st Edition, Aug. 1996, p. 257 (Machine translated Title) (Translation is not available).

(Continued)

*Primary Examiner* — Vishal V Vasisth
(74) *Attorney, Agent, or Firm* — BURR PATENT LAW, PLLC

(57) ABSTRACT

A zeolite membrane complex includes a longitudinal support member having at least one through hole extending along its length and a zeolite membrane on an inner peripheral surface of the through hole or over an outer peripheral surface of the support, from one end portion of the support to the other end portion thereof. Among constituent elements of the zeolite membrane except oxygen, an element with the highest percentage is a main element, and when the concentration of the main element is measured at three portions defined by dividing the support into three equal parts in the longitudinal direction, the concentration of the main element gradually decreases from the one end portion toward the other end portion, and the ratio of the concentration of the main element at the other end portion to that at the one end portion is 0.90 or more.

15 Claims, 6 Drawing Sheets

(51) Int. Cl.
*B01D 67/00* (2006.01)
*B01D 69/10* (2006.01)
(52) U.S. Cl.
CPC .......... *B01D 69/10* (2013.01); *B01D 2323/12* (2013.01); *B01D 2325/04* (2013.01)

(56) References Cited

FOREIGN PATENT DOCUMENTS

| | | | |
|---|---|---|---|
| CN | 101397142 | A | 4/2009 |
| JP | 5125221 | B2 | 1/2013 |
| JP | 5142040 | B2 | 2/2013 |

OTHER PUBLICATIONS

Chinese Office Action (with English translation) dated Jul. 13, 2022 (Application No. 202110188658.X).

* cited by examiner

ZEOLITE MEMBRANE COMPLEX, METHOD OF PRODUCING ZEOLITE MEMBRANE COMPLEX, AND HYDROTHERMAL SYNTHESIS APPARATUS

TECHNICAL FIELD

The present invention relates to a zeolite membrane complex, a method of producing a zeolite membrane complex, and a hydrothermal synthesis apparatus.

CROSS REFERENCE TO RELATED APPLICATION

The present application claims the benefit of priority to Japanese Patent Application No. 2020-28180 filed on Feb. 21, 2020 and Japanese Patent Application No. 2021-17178 filed on Feb. 5, 2021, the contents of which are incorporated herein by reference in their entirety.

BACKGROUND ART

Conventionally, a zeolite membrane complex in which a zeolite membrane is supported by a porous support has been used. As the support, generally, used is a ceramic porous body. Further, the synthesis of the zeolite membrane is usually performed by hydrothermal synthesis using a hydrothermal synthesis apparatus. In the hydrothermal synthesis, the zeolite membrane is formed in the presence of high temperature and pressure hot water. In the synthesis of the zeolite membrane, generally, in order to obtain a homogeneous membrane, a starting material solution is uniformly heated in the hydrothermal synthesis apparatus in a stationary state. It is possible to easily heat the starting material solution uniformly without any temperature gradient by, for example, heating the whole of the hydrothermal synthesis apparatus, or the like.

In Patent Publication No. 5125221 (Document 1), a hydrothermal synthesis apparatus is disclosed and in the hydrothermal synthesis by using this apparatus, a reaction container which is filled with a starting material solution and accommodates a support is rotated. In a hydrothermal synthesis disclosed in Patent Publication No. 5142040 (Document 2), a stirring rod provided with a stirring blade at its tip is accommodated in a reaction container and a starting material solution is stirred by rotating the stirring blade in the vicinity of a bottom thereof.

In recent years, in order to increase the membrane surface area, it is considered to apply a longitudinal (long-length) zeolite membrane complex having a length of 50 cm or more. In the hydrothermal synthesis of the zeolite membrane in the stationary state, however, in a case of forming a zeolite membrane on a longitudinal support, as compared with a case of using a shorter support, it becomes easier to cause variation in the composition of the zeolite membrane or the like, and defects such as poor membrane formation, generation of a heterogeneous phase, occurrence of cracks in a process of removing a structure-directing agent (heating process), and the like become easier to occur. Further, since the configuration of the hydrothermal synthesis apparatus becomes complicated when the methods of Documents 1 and 2 are used, the apparatus easily becomes expensive and it is difficult to apply the apparatus to the longitudinal zeolite membrane complex. Moreover, even when the methods of Documents 1 and 2 are used, the variation in the composition of the zeolite membrane or the like occurs and defects become easier to occur. Therefore, a longitudinal zeolite membrane complex having a zeolite membrane with few defects and a method of producing such a zeolite membrane complex are required.

SUMMARY OF INVENTION

The present invention is intended for a zeolite membrane complex, and it is an object of the present invention to provide a longitudinal zeolite membrane complex having a zeolite membrane with few defects.

One preferable zeolite membrane complex according to the present invention includes a support which is a longitudinal member having a length of 50 cm or more and has at least one through hole extending in a longitudinal direction and a zeolite membrane provided over an inner peripheral surface of the at least one through hole in the support or over an outer peripheral surface of the support, from one end portion of the support in the longitudinal direction to the other end portion thereof, and in the zeolite membrane complex, among constituent elements of the zeolite membrane except oxygen, an element with the highest percentage is assumed as a main element, and in a case where the concentration of the main element of the zeolite membrane is measured at three portions defined by dividing the support into three equal parts in the longitudinal direction, the concentration of the main element gradually decreases from a portion on the one end portion side toward a portion on the other end portion side, and the ratio of the concentration of the main element at the portion on the other end portion side to that at the portion on the one end portion side is 0.90 or more.

Another preferable zeolite membrane complex according to the present invention includes a support which is a longitudinal member having a length of 50 cm or more and has at least one through hole extending in a longitudinal direction and a zeolite membrane provided over an inner peripheral surface of the at least one through hole in the support or over an outer peripheral surface of the support, from one end portion of the support in the longitudinal direction to the other end portion thereof, and in the zeolite membrane complex, among constituent elements of the zeolite membrane except oxygen, an element with the highest percentage is assumed as a main element, and in a case where the concentration of the main element of the zeolite membrane is measured at a plurality of measurement points including respective points on three portions defined by dividing the support into three equal parts in the longitudinal direction, among concentrations of the main element at the plurality of measurement points, a concentration having the maximum absolute value of a difference from an average value of all the concentrations is specified, and an overall evaluation value obtained by dividing the absolute value of the difference of the concentration from the average value by the average value is 15% or less.

According to the present invention, it is possible to provide a longitudinal zeolite membrane complex having a zeolite membrane with few defects.

Preferably, a plurality of through holes are provided in the support along a radial direction from a central axis extending in the longitudinal direction and the zeolite membrane is provided on inner peripheral surfaces of the plurality of through holes, and two or more measurement points set on the inner peripheral surfaces of two or more through holes, respectively, at a predetermined position in the longitudinal direction among the plurality of through holes, are included in the plurality of measurement points.

Preferably, a single through hole extending in the longitudinal direction is provided in the support and the zeolite membrane is provided on the outer peripheral surface of the support, and two or more measurement points set on the outer peripheral surface along a circumferential direction at a predetermined position in the longitudinal direction are included in the plurality of measurement points.

Preferably, among concentrations of the main element at the two or more measurement points, a concentration having the maximum absolute value of a difference from an average value of the concentrations is specified and a partial evaluation value obtained by dividing the absolute value of the difference of the concentration from the average value by the average value is 10% or less.

Preferably, the thickness of the zeolite membrane is not larger than 5 μm.

Preferably, the overall evaluation value is not less than 1%.

The present invention is also intended for a method of producing a zeolite membrane complex. The method of producing a zeolite membrane complex according to the present invention includes a) preparing a longitudinal support having a length of 50 cm or more and b) forming a zeolite membrane on the support by immersing the support in a starting material solution for zeolite membrane formation and performing hydrothermal synthesis, and in the method of producing a zeolite membrane complex, while the starting material solution is heated at a predetermined synthesis temperature in the hydrothermal synthesis, the temperature gradient of the starting material solution between respective positions facing one side and the other side of the support in a longitudinal direction ranges from 0.1 to 10° C./m.

Preferably, until the starting material solution is heated to the synthesis temperature in the hydrothermal synthesis, the temperature gradient of the starting material solution between the respective positions facing the one side and the other side of the support is not higher than 10° C./m.

Preferably, the ratio of the mass of the starting material solution to the area of a region of the support in which the zeolite membrane is formed ranges from 1 to 15 kg/m².

Preferably, the support is held so that the longitudinal direction is a substantially vertical direction in the hydrothermal synthesis.

The present invention is still also intended for a hydrothermal synthesis apparatus. The hydrothermal synthesis apparatus according to the present invention includes a reaction container which accommodates a longitudinal support having a length of 50 cm or more and is filled with a starting material solution for zeolite membrane formation and a heating part for heating the reaction container, to thereby form a zeolite membrane on the support by hydrothermal synthesis, in the hydrothermal synthesis apparatus, while the heating part heats the starting material solution at a predetermined synthesis temperature in the hydrothermal synthesis, the temperature gradient of the starting material solution between respective positions facing one side and the other side of the support in a longitudinal direction ranges from 0.1 to 10° C./m.

These and other objects, features, aspects and advantages of the present invention will become more apparent from the following detailed description of the present invention when taken in conjunction with the accompanying drawings.

DESCRIPTION OF EMBODIMENTS

Figure 1:
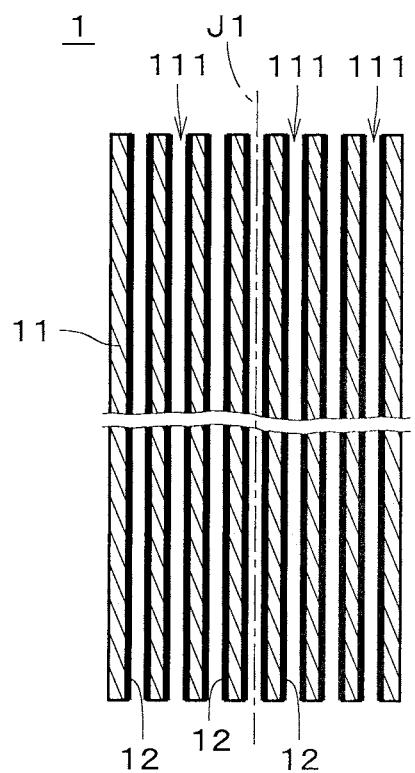
FIG. 1 is a cross-sectional view showing a zeolite membrane complex.
Figure 2:
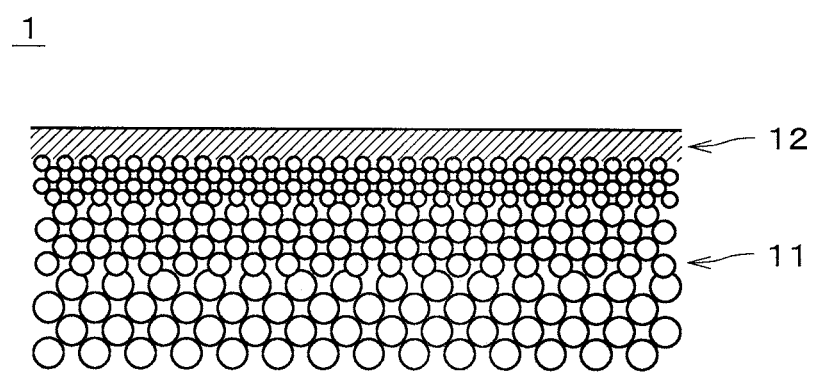
FIG. 2 is a cross-sectional view enlargedly showing part of the zeolite membrane complex.

FIG. 1 is a cross-sectional view showing a zeolite membrane complex 1, which shows a cross section including a central axis J1 of a support 11 described later. FIG. 2 is a cross-sectional view enlargedly showing part of the zeolite membrane complex 1. The zeolite membrane complex 1 includes a porous support 11 and a zeolite membrane 12 provided on the support 11. A zeolite membrane is at least obtained by forming zeolite on a surface of the support 11 in a membrane form and does not include a membrane obtained by simply dispersing zeolite particles in an organic membrane. In FIG. 1, the zeolite membrane 12 is shown by a heavy line. In FIG. 2, the zeolite membrane 12 is hatched. Further, in FIG. 2, the thickness of the zeolite membrane 12 is shown larger than the actual thickness.

Figure 3:
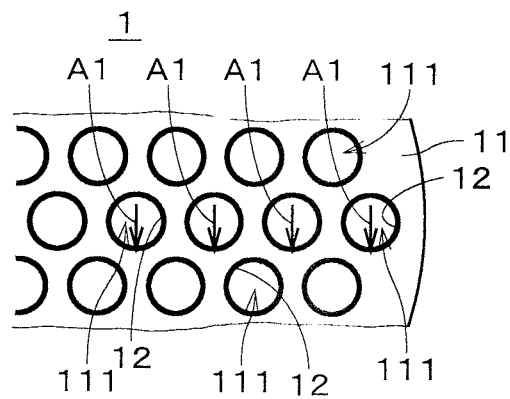
FIG. 3 is a view showing part of an end surface of the zeolite membrane complex.

The support 11 is a porous member that gas and liquid can permeate and has, for example, a substantially columnar shape around the central axis J1. In the exemplary case shown in FIG. 1, the support 11 is a monolith-type support having an integrally and continuously molded columnar main body provided with a plurality of through holes 111 extending in a longitudinal direction (i.e., an up-and-down direction in FIG. 1). As shown in FIG. 3, when an end surface of the zeolite membrane complex 1 is viewed along the central axis J1, the plurality of through holes 111 are two-dimensionally arranged. A cross section perpendicular to the longitudinal direction of each of the through holes 111 (i.e., cells) is, for example, substantially circular. In FIG. 1, the diameter of each through hole 111 is larger than the actual diameter, and the number of through holes 111 is smaller than the actual number. The zeolite membrane 12 is provided over an inner peripheral surface of each through hole 111, from one end portion of the support 11 in the longitudinal direction to the other end portion thereof, covering substantially the entire inner peripheral surface of the through hole 111.

Figure 4:
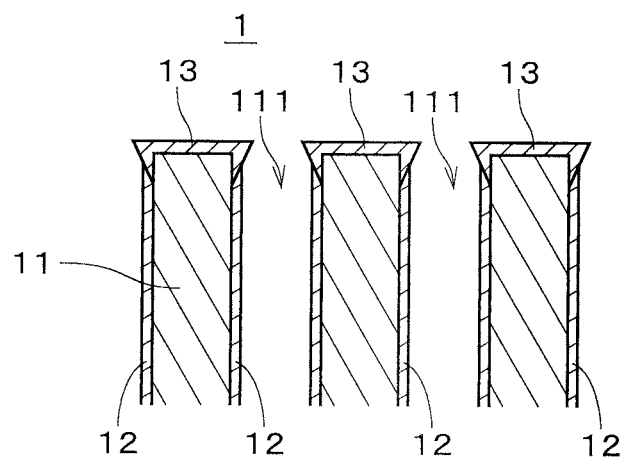
FIG. 4 is a cross-sectional view showing the vicinity of the end surface of the zeolite membrane complex.

FIG. 4 is a view enlargedly showing the vicinity of one end surface of the zeolite membrane complex 1. In an exemplary zeolite membrane complex 1, a sealing part 13 is provided on each end surface of the support 11 in the longitudinal direction. The sealing part 13 covers and seals the end surface. The sealing part 13 prevents the inflow and outflow of gas from/to the end surface of the support 11. The sealing part 13 is formed of, for example, glass or a resin. The material and the shape of the sealing part 13 may be changed as appropriate. In the zeolite membrane complex 1, part of the inner peripheral surface of the through hole 111 in the vicinity of the end surface of the support 11 may be covered with the sealing part 13. Specifically, a region in which no zeolite membrane 12 is formed may be provided in the extreme vicinity of the end surface on the inner peripheral surface of the through hole 111. In other words, in the zeolite membrane complex 1, that the zeolite membrane 12 is provided from one end portion of the support 11 to the other end portion thereof means that the zeolite membrane 12 is provided from one end portion of the support 11 to the other end portion thereof in the region on the inner peripheral surface of the through hole 111 of the support 11, which is not covered with the sealing part 13. Both ends of each through hole 111 in the longitudinal direction are not covered with the sealing parts 13, and therefore, the inflow and outflow of gas or the like to/from the through hole 111 from/to both ends thereof.

The length of the support 11 (i.e., the length in the up-and-down direction of FIG. 1) is 50 cm or more, preferably 65 cm or more, and more preferably 80 cm or more. Thus, the support 11 is a longitudinal member. The length of the support 11 is, for example, 200 cm or less. The outer diameter of the support 11 is, for example, 0.5 cm to 30 cm. The center distance between adjacent through holes 111 is, for example, 0.3 mm to 10 mm. The surface roughness (Ra) of the support 11 is, for example, 0.1 μm to 5.0 μm, and preferably 0.2 μm to 2.0 μm. Further, the shape of the support 11 may be, for example, honeycomb-like, flat plate-like, tubular, cylindrical, columnar, polygonal prismatic, or the like. When the support 11 has a tubular or cylindrical shape, the thickness of the support 11 is, for example, 0.1 mm to 10 mm.

As the material for the support 11, various materials (for example, ceramics or a metal) may be adopted only if the materials ensure chemical stability in the process step of forming the zeolite membranes 12 on the surface thereof. In the present preferred embodiment, the support 11 is formed of a ceramic sintered body. Examples of the ceramic sintered body which is selected as a material for the support 11 include alumina, silica, mullite, zirconia, titania, yttria, silicon nitride, silicon carbide, and the like. In the present preferred embodiment, the support 11 contains at least one kind of alumina, silica, and mullite.

The support 11 may contain an inorganic binder. As the inorganic binder, at least one of titania, mullite, easily sinterable alumina, silica, glass frit, a clay mineral, and easily sinterable cordierite can be used.

The average pore diameter of the support 11 is, for example, 0.01 μm to 70 μm, and preferably 0.05 μm to 25 μm. The average pore diameter of the support 11 in the vicinity of the surface on which the zeolite membrane 12 is formed is 0.01 μm to 1 μm, and preferably 0.05 μm to 0.5 μm. Regarding the pore diameter distribution of the entire support 11 including the surface and the inside thereof, D5 is, for example, 0.01 μm to 50 μm, D50 is, for example, 0.05 μm to 70 μm, and D95 is, for example, 0.1 μm to 2000 μm. The porosity of the support 11 in the vicinity of the surface on which the zeolite membrane 12 is formed is, for example, 25% to 50%.

The support 11 has, for example, a multilayer structure in which a plurality of layers with different average pore diameters are layered in a thickness direction. The average pore diameter and the sintered particle diameter in a surface layer including the surface on which the zeolite membrane 12 is formed are smaller than those in layers other than the surface layer. The average pole diameter in the surface layer of the support 11 is, for example, 0.01 μm to 1 μm, and preferably 0.05 μm to 0.5 μm. When the support 11 has a multilayer structure, the materials for the respective layers can be those described above. The materials for the plurality of layers constituting the multilayer structure may be the same as or different from one another.

The zeolite membrane 12 is a porous membrane having small pores. The zeolite membrane 12 can be used as a separation membrane for separating a specific substance from a mixed substance in which a plurality of types of substances are mixed, by using a molecular sieving function. As compared with the specific substance, any one of the other substances is harder to permeate the zeolite membrane 12. In other words, the permeance of any other substance through the zeolite membrane 12 is smaller than that of the above specific substance.

The thickness of the zeolite membrane 12 is, for example, 0.05 μm to 30 μm, preferably 0.1 μm to 20 μm, and further preferably 0.5 μm to 10 μm. When the thickness of the zeolite membrane 12 is increased, the separation performance increases. When the thickness of the zeolite membrane 12 is reduced, the permeance increases. Since the homogeneous zeolite membrane 12 can be obtained in the production of the zeolite membrane complex 1 described later, even in a thin zeolite membrane 12 having a thickness of, for example, 5 μm or less, it is possible to suppress occurrence of defects such as poor membrane formation or the like. The surface roughness (Ra) of the zeolite membrane 12 is, for example, 5 μm or less, preferably 2 μm or less, more preferably 1 μm or less, and further preferably 0.5 μm or less.

The average pore diameter of the zeolite membrane 12 is, for example, 1 nm or less. The average pore diameter of the zeolite membrane 12 is preferably not smaller than 0.2 nm and not larger than 0.8 nm, more preferably not smaller than 0.3 nm and not larger than 0.5 nm, and further preferably not smaller than 0.3 nm and not larger than 0.4 inn. The average pore diameter of the zeolite membrane 12 is smaller than that of the support 11 in the vicinity of the surface on which the zeolite membrane 12 is formed.

When the maximum number of membered rings of the zeolite forming the zeolite membrane 12 is n, an arithmetic average of the short diameter and the long diameter of an n-membered ring pore is defined as the average pore diameter. The n-membered ring pore refers to a pore in which the number of oxygen atoms in the part where the oxygen atoms and T atoms are bonded to form a ring structure is n. When the zeolite has a plurality of n-membered ring pores having the same n, an arithmetic average of the short diameters and the long diameters of all the n-membered ring pores is defined as the average pore diameter of the zeolite. Thus, the average pore diameter of the zeolite membrane is uniquely determined depending on the framework structure of the zeolite and can be obtained from values disclosed in "Database of Zeolite Structures" [online], Internet <URL: http://www.iza-structure.org/databases/> of the International Zeolite Association.

There is no particular limitation on the type of the zeolite forming the zeolite membrane 12, but the zeolite membrane 12 may be formed of, for example, AEI-type, AEN-type, AFN-type, AFV-type, AFX-type, BEA-type, CHA-type, DDR-type, ERI-type, ETL-type, FAU-type (X-type, Y-type), GIS-type, LEV-type, LTA-type, MEL-type, MFI-type, MOR-type, PAU-type, RHO-type, SAT-type, SOD-type zeolite, or the like.

From the viewpoint of an increase in the permeance of $CO_2$ and an improvement in the separation performance, it is preferable that the maximum number of membered rings of the zeolite should be 8 or less (for example, 6 or 8). The zeolite membrane 12 is formed of, for example, DDR-type zeolite. In other words, the zeolite membrane 12 is a zeolite membrane formed of the zeolite having a structure code of "DDR" which is designated by the International Zeolite Association. In this case, the unique pore diameter of the zeolite forming the zeolite membrane 12 is 0.36 nm×0.44 nm, and the average pule diameter is 0.40 nm.

The zeolite membrane 12 contains, for example, silicon (Si). The zeolite membrane 12 may contain, for example, any two or more of Si, aluminum (Al), and phosphorus (P). In this case, as the zeolite forming the zeolite membrane 12, zeolite in which atoms (T-atoms) located at the center of an oxygen tetrahedron ($TO_4$) constituting the zeolite include only Si or Si and Al, AlPO-type zeolite in which T-atoms include Al and P, SAPO-type zeolite in which T-atoms include Si, Al, and P, MAPSO-type zeolite in which T-atoms include magnesium (Mg), Si, Al, and P, ZnAPSO-type zeolite in which T-atoms include zinc (Zn), Si, Al, and P, or the like can be used. Some of the T-atoms may be replaced by other elements.

When the zeolite membrane 12 contains Si atoms and Al atoms, the ratio of Si/Al in the zeolite membrane 12 is, for example, not less than 1 and not more than 100,000. The Si/Al ratio is preferably 5 or more, more preferably 20 or more, and further preferably 100 or more. In short, the higher the ratio is, the better. By adjusting the mixing ratio of an Si source and an Al source in a later-described starting material solution, or the like, it is possible to adjust the Si/Al ratio in the zeolite membrane 12. The zeolite membrane 12 may contain an alkali metal. The alkali metal is, for example, sodium (Na) or potassium (K).

In the zeolite membrane complex 1, the permeance of $CO_2$ through the zeolite membrane 12 at 20° C. to 400° C. is, for example, 100 nmol/$m^2$·s·Pa or more. Further, the ratio (permeance ratio) of the permeance of $CO_2$ through the zeolite membrane 12 to the permeance (leakage) of $CH_4$ at 20° C. to 400° C. is, for example, 100 or more. The permeance and the permeance ratio are those in a case where the partial pressure difference of $CO_2$ between the supply side and the permeation side of the zeolite membrane 12 is 1.5 MPa.

In the zeolite membrane complex 1, the zeolite membrane 12 which is homogeneous is formed by a later-described production method. In the other words, in the zeolite membrane 12, defects such as poor membrane formation, generation of a heterogeneous phase, occurrence of cracks in a process of removing a structure-directing agent (heating process), and the like are reduced. The defects such as poor membrane formation, occurrence of cracks, and the like can be checked by, for example, performing a defect staining test. In the defect staining test, first, an aqueous solution containing a dye such as rhodamine B or the like is supplied onto a surface of the zeolite membrane 12. Subsequently, the aqueous solution on the surface of the zeolite membrane 12 is washed off with water or the like. After that, the surface of the zeolite membrane 12 is visually checked or observed with an optical microscope or the like, and it is thereby checked if staining is found in the zeolite membrane 12. When there is a defect, staining is found in the zeolite membrane 12. In the zeolite membrane complex 1 in which the homogeneous zeolite membrane 12 is formed, since the defects are reduced, almost no defect is found even by the defect staining test.

In the zeolite membrane complex 1, when an element with the highest percentage among constituent elements of the zeolite membrane 12 except oxygen is assumed as a main element, variation in the concentration of the main element of the zeolite membrane 12 in the whole is reduced. Further, when there are a plurality of candidates for the main element, any one of the candidates may be selected as the main element. The variation in the concentration of the main element is obtained as follows. First, when three portions defined by dividing the support 11 into three equal parts in the longitudinal direction are assumed as a support upper portion, a support middle portion, and a support lower portion, a plurality of measurement points are set in each of the support upper portion, the support middle portion, and the support lower portion. The support middle portion is a portion between the support upper portion and the support lower portion. Furthermore, the respective names of the support upper portion, the support middle portion, and the support lower portion are determined for the convenience, and these names do not mean that the zeolite membrane complex 1 is used or produced in a state where the longitudinal direction of the support 11 is in parallel with a vertical direction.

As described earlier, when the support 11 is viewed along the central axis J1, the through holes 111 are two-dimensionally arranged (see FIG. 3), and the plurality of through holes 111 are provided along a radial direction about the central axis J1, from the central axis J1 extending in the longitudinal direction. In each of the support upper portion, the support middle portion, and support lower portion, two or more measurement points (hereinafter, referred to as a "measurement point group") are provided on the respective inner peripheral surfaces of two or more through holes 111, respectively, among the plurality of through holes 111 aligned along one radial direction (one direction going away from the central axis J1). In FIG. 3, four measurement points included in the measurement point group are represented by arrows Al. In each of the support upper portion, the support middle portion, and support lower portion, the number of measurement points included in the measurement point group is preferably three or more, and more preferably four or more. In consideration of the time required for the measurement, the number of measurement points included in one measurement point group is, for example, ten or less. Further, in the end surface of the support 11, the through holes 111 do not always need to be arranged in a regular manner but may be arranged in an irregular manner. Furthermore, the through holes 111 in which the measurement point group is set do not need to be arranged exactly along the one radial direction but may be arranged substantially along the one radial direction.

Subsequently, at each of the plurality of measurement points including the measurement point group in the support upper portion, the measurement point group in the support middle portion, and the measurement point group in the support lower portion, the concentration of the main element is measured. In the measurement of the concentration of the main element, at the positions of the through holes 111 (the through holes 111 on which the measurement point group is set) aligned in the radial direction, the zeolite membrane complex 1 is cut at a plane in parallel with the central axis J1. Then, the concentration of each of the constituent elements of the zeolite membrane 12 is measured at each measurement point by the XPS (X-ray photoelectron spectroscopy) or the EDX (energy dispersive X-ray analysis). It is preferable that the value of the concentration at each measurement point should be an average value or a median of values obtained by a plurality of measurements.

After the measurements at all the above-described plurality of measurement points are finished, an average value of the concentrations of the main element at all the measurement points is obtained. Further, among the concentrations of the main element at all the measurement points, a concentration having the maximum absolute value of a difference from the average value is specified. Then, by dividing the absolute value of the difference of the concentration (the absolute value of the difference from the average value) by the average value, an overall evaluation value indicating the variation in the concentration of the main element at the measurement points in the whole support 11 is obtained. Herein, the variation in the concentration of the main element is represented by the maximum deviation. In the zeolite membrane complex 1 in which the zeolite membrane 12 is formed by the later-described production method, the overall evaluation value is, for example, 15% or less. In a preferable zeolite membrane complex 1, the overall evaluation value is 13.5% or less, and in a more preferable zeolite membrane complex 1, the overall evaluation value is 12% or less. Furthermore, since the membrane strength can be increased by causing an appropriate stress to occur, the overall evaluation value is 1% or more in the preferable zeolite membrane complex 1.

In the zeolite membrane complex 1, variation in the concentration of the main element in a case where attention is paid to a predetermined position in the longitudinal direction is also reduced. Specifically, an average value of the concentrations of the main element at the measurement point group in the support middle portion is obtained, and among the concentrations of the main element at the measurement point group, a concentration having the maximum absolute value of a difference from the average value is specified. Then, by dividing the absolute value of the difference of the concentration (the absolute value of the difference from the average value) by the average value, a partial evaluation value indicating the variation in the concentration of the main element in the support middle portion is obtained. In the zeolite membrane complex 1 in which the zeolite membrane 12 is formed by the later-described production method, the partial evaluation value is, for example, 10% or less. In a preferable zeolite membrane complex 1, the partial evaluation value is 8.5% or less, and in a more preferable zeolite membrane complex 1, the partial evaluation value is 7% or less. The same also applies to the support upper portion and the support lower portion.

In the zeolite membrane 12 on the inner peripheral surface of each through hole 111, it is preferable that the concentration of the main element should gradually decrease or increase in order of the support upper portion, the support middle portion, and the support lower portion. Specifically, the concentration of the main element in the support middle portion takes a value between that in the support upper portion and that in the support lower portion. In other words, in the preferable zeolite membrane complex 1, in the three portions defined by dividing the support 11 into three equal parts in the longitudinal direction, the concentration of the main element gradually decreases from a portion on one end portion side toward a portion on the other end portion side. Herein, that "the concentration of the main element gradually decrease" includes a case where the concentration of the main element is constant (the same applies to a later-described zeolite membrane complex 1a).

Further, in the zeolite membrane 12 on the inner peripheral surface of each through hole 111, when the ratio of the concentration of the main element at the portion on the other end portion side to that at the portion on the one end portion side is obtained, it is preferable that the ratio between the concentrations of the main element should be not lower than 0.90 and not higher than 1.00. The ratio between the concentrations of the main element is more preferably 0.91 or more and further preferably 0.93 or more. The ratio between the concentrations of the main element is obtained in three or more through holes 111, and it is preferable that the ratio should be 0.90 or more in each of the three or more through holes 111. Thus, in the later-described production method, formed is the zeolite membrane 12 in which the concentration of the main element gradually decreases along the longitudinal direction and the difference of the concentrations of the main element is small.

Figure 5:
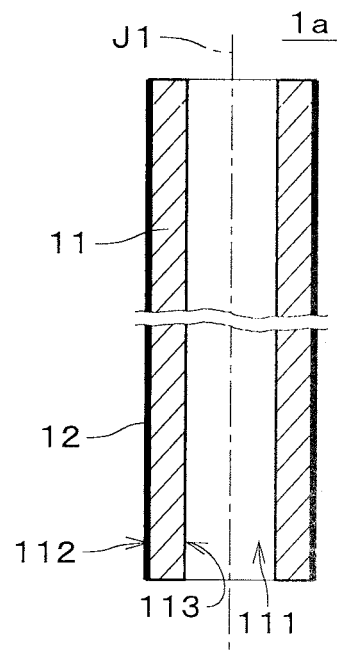
FIG. 5 is a cross-sectional view showing another example of the zeolite membrane complex.
Figure 6:
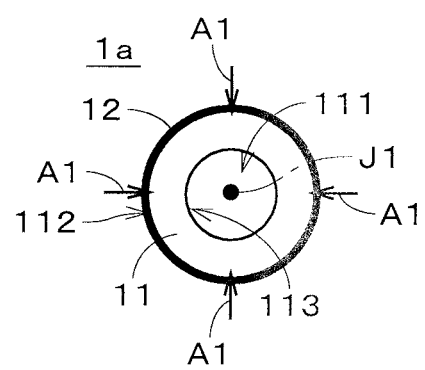
FIG. 6 is a view showing an end surface of another exemplary zeolite membrane complex.

FIGS. 5 and 6 are views showing another example of the zeolite membrane complex. In FIG. 5, a cross section of a zeolite membrane complex 1a including a central axis J1 of a support 11 is shown, and in FIG. 6, an end surface of the zeolite membrane complex 1a is shown.

The support 11 of the zeolite membrane complex 1a has a cylindrical shape and is a longitudinal member like the support 11 shown in FIG. 1. The support 11 includes an inner peripheral surface 113 and an outer peripheral surface 112. The inner peripheral surface 113 is a substantially cylindrical surface around the central axis J1, extending in the longitudinal direction (i.e., an up-and-down direction in FIG. 5). A substantially columnar space inside the inner peripheral surface 113 in a radial direction is a through hole 111. Specifically, in the zeolite membrane complex 1a, a single through hole 111 extending in the longitudinal direction is provided. The outer peripheral surface 112 is a substantially cylindrical surface surrounding a periphery of the inner peripheral surface 113 and positioned outside the inner peripheral surface 113 in the radial direction. The zeolite membrane 12 is provided over the outer peripheral surface 112 of the support 11, from one end portion of the support 11 in the longitudinal direction to the other end portion thereof, covering substantially the entire outer peripheral surface 112 of the support 11. Respective preferable shapes, structures, materials, and the like of the support 11 and the zeolite membrane 12 are the same as those in the zeolite membrane complex 1 of FIG. 1. Further, like in FIG. 4, a sealing part 13 may be provided.

In the zeolite membrane complex 1a, the zeolite membrane 12 which is homogeneous is formed by the later-described production method, and the overall evaluation value indicating the variation in the concentration of the main element in the whole becomes small. In a case where the overall evaluation value is obtained in the zeolite membrane complex 1a, in each of the support upper portion, the support middle portion, and the support lower portion, two or more measurement points (i.e., a "measurement point group") are provided on the outer peripheral surface 112 along a circumferential direction around the central axis J1. In FIG. 6, four measurement points are represented by the arrows A1.

Like in the zeolite membrane complex 1 of FIG. 1, after the measurements are finished at the plurality of measurement points including the measurement point group in the support upper portion, the measurement point group in the support middle portion, and the measurement point group in the support lower portion, an average value of the concentrations of the main element at all the measurement points is obtained. Further, among the concentrations of the main element at all the measurement points, a concentration having the maximum absolute value of a difference from the average value is specified. Then, by dividing the absolute value of the difference of the concentration by the average value, an overall evaluation value indicating the variation in the concentration of the main element at all the measurement points is obtained. In the zeolite membrane complex 1a, the overall evaluation value is, for example, 15% or less. In a preferable zeolite membrane complex 1a, the overall evaluation value is 13.5% or less, and in a more preferable zeolite membrane complex 1a, the overall evaluation value is 12% or less. Furthermore, since the membrane strength can be increased by causing an appropriate stress to occur, the overall evaluation value is 1% or more in the preferable zeolite membrane complex 1a.

In the zeolite membrane complex 1a, variation in the concentration of the main element at a predetermined position in the longitudinal direction is also reduced. Specifically, among the concentrations of the main element at the measurement point group in the support middle portion, a concentration having the maximum absolute value of a difference from the average value is specified. Then, by dividing the absolute value of the difference of the concentration by the average value, a partial evaluation value indicating the variation in the concentration of the main element in the support middle portion is obtained. In the zeolite membrane complex 1a in which the zeolite membrane 12 is formed by the later-described production method, the partial evaluation value is, for example, 10% or less. In a preferable zeolite membrane complex 1a, the partial evaluation value is 8.5% or less, and in a more preferable zeolite membrane complex 1a, the partial evaluation value is 7% or less. The same also applies to the support upper portion and the support lower portion.

In the zeolite membrane 12 on the outer peripheral surface 112 of the support 11, it is preferable that the concentration of the main element should gradually decrease or increase in order of the support upper portion, the support middle portion, and the support lower portion. Herein, the concentration of the main element in each of the support upper portion, the support middle portion, and the support lower portion is, for example, an average value of the concentrations of the main element at a plurality of (e.g., four) points set on the outer peripheral surface 112 at regular angular intervals in the circumferential direction. In the three portions defined by dividing the support 11 into three equal parts in the longitudinal direction, the concentration of the main element gradually decreases from a portion on one end portion side toward a portion on the other end portion side. Further, when the ratio of the concentration of the main element at the portion on the other end portion side to that at the portion on the one end portion side is obtained, the ratio between the concentrations of the main element is preferably 0.90 or more, more preferably 0.91 or more, and further preferably 0.93 or more. Thus, in the later-described production method, formed is the zeolite membrane 12 in which the concentration of the main element gradually decreases along the longitudinal direction and the difference of the concentrations of the main element is small.

In the longitudinal zeolite membrane complex 1 or 1a, since the variation in the concentration of the main element in the longitudinal direction is important, only one measurement point may be set in each of the support upper portion, the support middle portion, and the support lower portion. Specifically, in a case where the concentrations of the main element of the zeolite membrane 12 are measured at a plurality of measurement points including respective points on three portions defined by dividing the support 11 into three equal parts in the longitudinal direction, an overall evaluation value obtained from the concentrations of the main element at the plurality of measurement points has only to be 15% or less.

Figure 7:
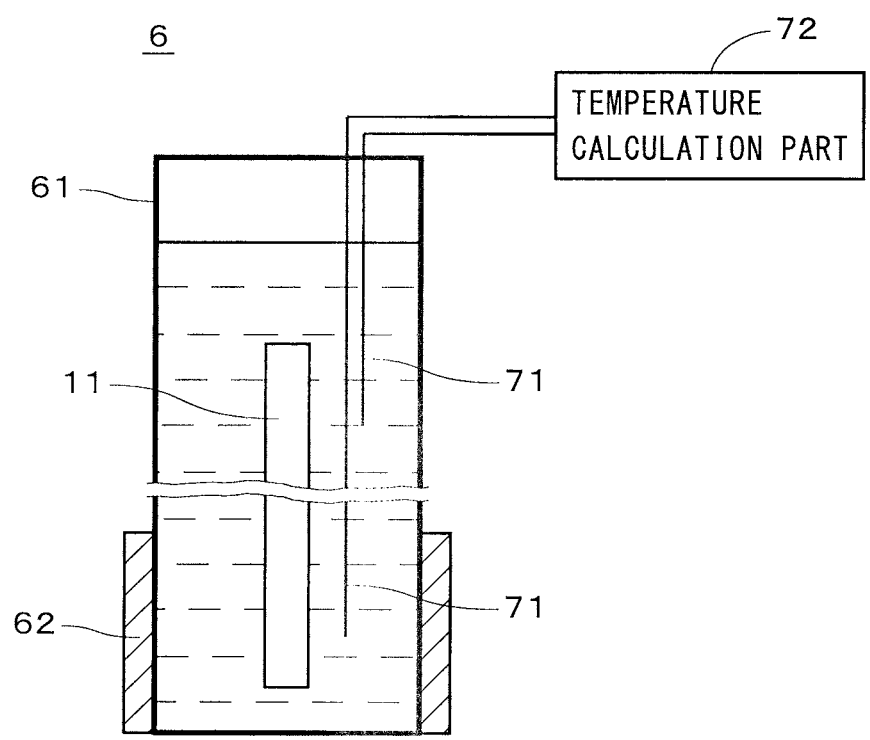
FIG. 7 is a diagram showing a hydrothermal synthesis apparatus.

Next, production of the zeolite membrane complex 1 or 1a will be described. FIG. 7 is a diagram showing a configuration of a hydrothermal synthesis apparatus 6 used for producing the zeolite membrane complex 1 or 1a. The hydrothermal synthesis apparatus 6 includes a reaction container 61 and a heating part 62.

The reaction container 61 is, for example, a substantially cylindrical sealed container with a cover and a bottom. The reaction container 61 has a long length in the up-and-down direction of FIG. 7 so that the long-length support 11 having a length of 50 cm or more can be accommodated. Though the up-and-down direction of FIG. 7 does not always need to be a vertical direction, it is preferable that the support 11 should be arranged so that the longitudinal direction thereof can be a substantially vertical direction since it thereby becomes easier to uniformly stir a starting material solution. In later-described formation of the zeolite membrane 12, the support 11 is accommodated in the reaction container 61 and the reaction container 61 is filled with a starting material solution for zeolite membrane formation. The length of the reaction container 61 in the longitudinal direction is, for example, not less than 1.1 times the length of the support 11 and not more than 2.0 times thereof. The inner diameter of the reaction container 61 is, for example, not less than 1.1 times the outer diameter of the support 11 and not more than 20 times thereof. When the outer diameter of the support 11 is relatively small, a plurality of supports 11 may be accommodated in the reaction container 61. Though the reaction container 61 is shown in a simplified manner in FIG. 7, the reaction container 61 has, for example, a two-layer structure having an inner container formed of a fluorine-based resin and a jacket formed of a metal such as stainless steel or the like. The shape and the structure of the reaction container 61 may be changed randomly.

The heating part 62 has, for example, a sheet-like electric heater, and in the exemplary case shown in FIG. 7, the heating part 62 twines around a lower portion of the reaction container 61. In the heating part 62, the heating temperature can be adjusted within a predetermined range (for example, 100° C. to 200° C.), and an outer surface of the lower portion of the reaction container 61 is heated to a preset temperature in the later-described formation of the zeolite membrane 12. With this heating, formed is a temperature gradient in which the temperature is gradually lowered in the starting material solution inside the reaction container 61 from the lower portion toward an upper portion thereof. In the hydrothermal synthesis apparatus 6, the position at which the heating part 62 is provided, the heating temperature of the heating part 62, and the like are determined so that (the absolute value of) the temperature gradient can be 0.1 to 10° C./m in a steady state.

As shown in FIG. 7, the temperature gradient in the starting material solution can be measured by using two thermocouples 71 and a temperature calculation part 72. In the measurement of the temperature gradient, a temperature sensing part of one thermocouple 71 is disposed at a position facing one side of the support 11 in the longitudinal direction (exactly, a position facing the outer peripheral surface at a portion of the one side from the center in the longitudinal direction), and a temperature sensing part of the other thermocouple 71 is disposed at a position facing the other side of the support 11. In the hydrothermal synthesis apparatus 6, hydrothermal synthesis has only to be performed under the condition that the temperature gradient ranges from 0.1 to 10° C./m, and in an actual hydrothermal synthesis, it is not always necessary to provide the thermocouples 71 and the temperature calculation part 72.

In the hydrothermal synthesis apparatus 6, while the starting material solution is heated at a predetermined synthesis temperature, the temperature gradient of 0.1 to 10°

C./m is formed in the starting material solution inside the reaction container 61, and it thereby becomes possible to appropriately convect and uniformly stir the starting material solution. In order to more surely achieve appropriate convection of the starting material solution, the lower limit value of the temperature gradient is preferably 0.4° C./m, more preferably 0.8° C./m, and still more preferably 1.0° C./m. Similarly, the upper limit value of the temperature gradient is preferably 8° C./m and more preferably 6° C./m. Further, until the starting material solution is heated to the synthesis temperature, in order to suppress nonuniform stirring of the starting material solution, it is preferable that the temperature gradient of the starting material solution inside the reaction container 61 should be not higher than 10° C./m. Additionally, in order to promote the stirring of the starting material solution, it is preferable that there should be a case where the temperature gradient of the starting material solution inside the reaction container 61 is made not lower than 0.3° C./m until the starting material solution is heated to a predetermined synthesis temperature. If the above temperature gradient can be achieved, the upper portion or a middle portion of the reaction container 61 as well as the lower portion thereof may be heated to an appropriate temperature. In the heating part 62, indirect heating using hot air, oil, or the like, as well as direct heating using the electric heater or the like, may be performed.

Figure 8:
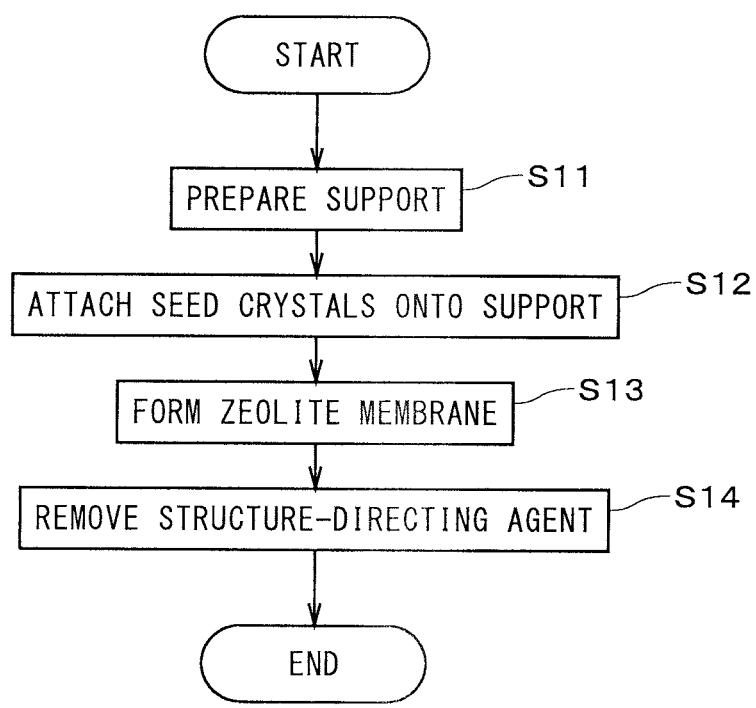
FIG. 8 is a flowchart showing a flow for producing the zeolite membrane complex.

Next, with reference to FIG. 8, an exemplary flow for producing the zeolite membrane complex 1 or 1a will be described. The production of the zeolite membrane complex 1 or 1a shown in FIG. 8 is also production of the zeolite membrane 12. In the production of the zeolite membrane complex 1 or 1a, first, a longitudinal support 11 having a length of 50 cm or more is prepared (Step S11). Further, seed crystals to be used for producing the zeolite membrane 12 are prepared. In one exemplary case where the DDR-type zeolite membrane 12 is formed, DDR-type zeolite powder is synthesized by hydrothermal synthesis, and the seed crystals are acquired from the zeolite powder. The zeolite powder itself may be used as the seed crystals, or may be processed by pulverization or the like, to thereby acquire the seed crystals.

Subsequently, the porous support 11 is immersed in a solution in which the seed crystals are dispersed, and the seed crystals are thereby attached onto the support 11 (Step S12). Alternatively, the solution in which the seed crystals are dispersed is brought into contact with a portion on the support 11 where the zeolite membrane 12 is to be formed, and the seed crystals are thereby attached onto the support 11. A seed crystals attachment support is thereby produced. The seed crystals may be attached onto the support 11 by any other method.

On the other hand, the reaction container 61 of the hydrothermal synthesis apparatus 6 shown in FIG. 7 is filled with the starting material solution for zeolite membrane formation. The starting material solution is produced by dissolving and dispersing a raw material of the zeolite membrane 12, a structure-directing agent (hereinafter, also referred to as an "SDA"), and the like in a solvent. In the exemplary case where the DDR-type zeolite membrane 12 is formed, the starting material solution contains the Si source, the Al source, the SDA, and the solvent, and the composition of the starting material solution is, for example, 1.00 $SiO_2$: 0.01 $Al_2O_3$:0.015 SDA:20 $H_2O$. By adjusting the mixing ratio of the Si source and the Al source in the starting material solution, or the like, the composition of the zeolite membrane 12 can be adjusted. As the solvent for the starting material solution, a water-soluble solvent such as alcohol or the like or a water-insoluble solvent may be used. The SDA contained in the starting material solution is, for example, an organic substance. As the SDA, for example, 1-adamantanamine can be used. The concentration of the main element in the starting material solution is, for example, 1 to 20, and preferably 2 to 15.

Subsequently, the support 11 is inserted into the inside of the reaction container 61 in a state where the longitudinal direction of the support 11 is substantially in parallel with the longitudinal direction of the reaction container 61. The whole support 11 with the seed crystals attached thereto is immersed in the starting material solution. At that time, the support 11 inside the reaction container 61 is held by a not-shown holding member while being away from a bottom surface of the reaction container 61. Further, when a region of the support 11 where the zeolite membrane 12 is to be formed is referred to as a target region, the ratio (hereinafter, referred to as a "starting material solution mass/membrane surface area") of the mass of the starting material solution to the area of the target region ranges, for example, from 1 to 15 $kg/m^2$, and preferably from 2 to 10 $kg/m^2$. In the zeolite membrane complex 1 of FIG. 1, the target region refers to the inner peripheral surfaces of the plurality of through holes 111, and in the zeolite membrane complex 1a of FIG. 5, the target region refers to the outer peripheral surface 112 of the support 11. It is preferable that any region of the support 11, other than the target region, should be masked or the like so that the region cannot come into contact with the starting material solution.

After that, the reaction container 61 is heated by the heating part 62 while being sealed. The hydrothermal synthesis is thereby performed to cause the zeolite to grow from the seed crystals on the surface as a nucleus, and the zeolite membrane 12 is formed on the target region of the support 11 (Step S13). The zeolite membrane 12 is formed of, for example, the DDR-type zeolite.

In the hydrothermal synthesis, while the heating part 62 heats the starting material solution at a predetermined synthesis temperature, the temperature gradient of the starting material solution between respective positions facing one side and the other side of the support 11 in the longitudinal direction ranges from 0.1 to 10° C./m. It is thereby possible to appropriately convect and uniformly stir the starting material solution in the reaction container 61. Further, since the support 11 is held while being away from the bottom surface of the reaction container 61, it becomes possible for a flow of the starting material solution due to the convection to pass through the through hole 111 of the support 11. The starting material solution inside the through hole 111 is also thereby stirred. Further, the above-described synthesis temperature is the maximum temperature to be kept for a predetermined time in the hydrothermal synthesis. The synthesis temperature is evaluated with the temperature of the starting material solution near the center portion of the reaction container 61 in the longitudinal direction. The synthesis temperature is preferably from 80° C. to 200° C., and for example, 160° C. The time while the synthesis temperature is kept is preferably from 3 to 100 hours, and for example, 30 hours. The time while the temperature gradient of the starting material solution ranges from 0.1 to 10° C./m has only to be at least part of the time while the synthesis temperature is kept, and is preferably one half or more of the time while the synthesis temperature is kept.

After the hydrothermal synthesis is finished, the support 11 and the zeolite membrane 12 are washed with pure water. The support 11 and the zeolite membrane 12 after being washed are dried at, for example, 100° C. After drying of the support 11 and the zeolite membrane 12 is finished, a heat treatment is performed on the zeolite membrane 12 under an oxidizing gas atmosphere, to thereby combustion-remove the SDA in the zeolite membrane 12 (Step S14). This causes micropores in the zeolite membrane 12 to pierce the zeolite membrane 12. Preferably, the SDA is almost completely removed.

The heating temperature for removing the SDA is, for example, from 300° C. to 700° C. The heating time is, for example, from 5 to 200 hours. The oxidizing gas atmosphere is an atmosphere containing oxygen and for example, the air. With the above processing, the zeolite membrane complex 1 or 1a is obtained.

Herein, in the hydrothermal synthesis apparatus which uniformly heats the whole reaction container 61 or the hydrothermal synthesis apparatus which uniformly heats a portion between respective positions corresponding to the one side and the other side of the support 11 in the longitudinal direction of the reaction container 61, in a case of forming a zeolite membrane on a longitudinal support, it becomes easier to cause variation in the composition of the zeolite membrane or the like, and defects such as poor membrane formation, generation of a heterogeneous phase, occurrence of cracks in a process of removing a structure-directing agent (heating process), and the like become easier to occur. What causes this occurrence of such defects is not sure, but a possible cause is that deviation of the concentration occurs in the starting material solution due to consumption, precipitation, or the like of the raw material in the hydrothermal synthesis.

Further, like in the apparatus disclosed in Patent Publication No. 5125221 (Document 1), in a case where the reaction container is rotated about a predetermined rotation axis, in the large-size reaction container, there exist a portion in which a large stirring effect in a radial direction is produced and another portion in which a small stirring effect is produced, and variation in the composition of a zeolite membrane or the like thereby occurs. Like in the apparatus disclosed in Patent Publication No. 5142040 (Document 2), also in another case where the stirring blade is rotated at the bottom inside the large-size reaction container, a difference in the stirring effect between the vicinity of the bottom and an upper portion increases, and variation in the composition of a zeolite membrane or the like thereby occurs. Further, when the stirring blade and the reaction container rub each other, contamination occurs and this causes some defects.

On the other hand, in the production of the zeolite membrane complex 1 or 1a by using the hydrothermal synthesis apparatus 6, while the starting material solution is heated at a predetermined synthesis temperature in the hydrothermal synthesis, the temperature gradient of the starting material solution between respective positions facing one side and the other side of the support 11 in the longitudinal direction ranges from 0.1 to 10° C./m. The starting material solution can thereby be uniformly stirred by convection in a state where the support 11 is disposed stationarily inside the reaction container 61 without providing a large-scale mechanism, and it is possible to suppress occurrence of deviation of the concentration of the starting material solution due to consumption, precipitation, or the like of the raw material in the hydrothermal synthesis. As a result, it is thereby possible to provide the longitudinal zeolite membrane complex 1 or 1a having the zeolite membrane 12 with few defects.

Next, practical examples of production of the zeolite membrane complexes will be described. First, a monolith-type support having a length of 100 cm (see FIG. 1) and a cylindrical support having a length of 100 cm (see FIG. 5) are prepared. Further, a starting material solution for DDR-type zeolite membrane formation, a starting material solution for AFX-type zeolite membrane formation, a starting material solution for CHA-type zeolite membrane formation, a starting material solution for AEI-type zeolite membrane formation, and a starting material solution for MFI-type zeolite membrane formation are prepared.

The reaction container 61 of the hydrothermal synthesis apparatus 6 is filled with the starting material solution for DDR-type zeolite membrane formation, and the porous support 11 with the seed crystals attached thereto is immersed in the starting material solution, to thereby perform the hydrothermal synthesis. By this hydrothermal synthesis, zeolite membrane complexes of Examples 1 to 9 are obtained. At that time, in Examples 1 to 5 and Examples 7 to 9, the monolith-type support is used, and in Example 6, the cylindrical (single tube-type) support is used. Values of the starting material solution mass/membrane surface area (i.e., the ratio of the mass of the starting material solution to the area of the target region) and the temperature gradient of the starting material solution in the hydrothermal synthesis are shown in Table 1. The temperature gradient of the starting material solution is measured by using the thermocouples 71 and the temperature calculation part 72 which are attached to the hydrothermal synthesis apparatus 6.

TABLE 1

| | Zeolite Membrane | | | Synthesis Condition | | Variation in Concentration of Main Element | | Concentration Change of Main Element | | | Defect Evaluation |
|---|---|---|---|---|---|---|---|---|---|---|---|
| | | | | Temperature Gradient of Starting | Starting Material Solution Mass/ | | | | | | |
| | Zeolite Type | Main Element | Shape of Support | Material Solution [° C./m] | Membrane Surface Area [kg/m²] | Overall Evaluation Value | Partial Evaluation Value | Support Upper Portion | Support Middle Portion | Support Lower Portion | Defect Staining Test |
| Example 1 | DDR | Si | Monolith | 0.1 | 6 | −14% | −5% | 1.000 | 0.990 | 0.936 | ◯ |
| Example 2 | DDR | Si | Monolith | 1 | 6 | −10% | 2% | 1.000 | 0.997 | 0.983 | ◯ |
| Example 3 | DDR | Si | Monolith | 2 | 6 | 3% | 1% | — | — | — | ◯ |
| Example 4 | DDR | Si | Monolith | 5 | 6 | 10% | 3% | — | — | — | ◯ |
| Example 5 | DDR | Si | Monolith | 10 | 6 | −9% | 3% | — | — | — | ◯ |
| Example 6 | DDR | Si | Single Tube | 1 | 6 | 5% | 2% | — | — | — | ◯ |
| Example 7 | DDR | Si | Monolith | 1 | 1 | −12% | 10% | — | — | — | ◯ |

TABLE 1-continued

| | Zeolite Membrane | | | Synthesis Condition | | Variation in Concentration of Main Element | | Concentration Change of Main Element | | | Defect Evaluation |
| | | | | Temperature Gradient of Starting Material Solution [° C./m] | Starting Material Solution Mass/ Membrane Surface Area [kg/m²] | | | | | | |
| | Zeolite Type | Main Element | Shape of Support | | | Overall Evaluation Value | Partial Evaluation Value | Support Upper Portion | Support Middle Portion | Support Lower Portion | Defect Staining Test |
|---|---|---|---|---|---|---|---|---|---|---|---|
| Example 8 | DDR | Si | Monolith | 1 | 10 | 5% | −5% | — | — | — | ◯ |
| Example 9 | DDR | Si | Monolith | 1 | 150 | 5% | −2% | 1.000 | 1.000 | 1.000 | ◯ |
| Example 10 | AFX | Si | Monolith | 1 | 6 | −10% | −5% | — | — | — | ◯ |
| Example 11 | CHA | Si | Monolith | 1 | 6 | 8% | −4% | — | — | — | ◯ |
| Example 12 | AEI | Al | Monolith | 1 | 6 | 11% | 9% | — | — | — | ◯ |
| Example 13 | MFI | Si | Monolith | 1 | 6 | 4% | 3% | — | — | — | ◯ |
| Comparative Example 1 | DDR | Si | Monolith | 0 | 6 | −20% | 11% | 1.000 | 0.813 | 0.910 | X Crack |
| Comparative Example 2 | DDR | S1 | Monolith | 20 | 6 | 35% | 15% | — | — | — | X Base Material Exposure |
| Comparative Example 3 | DDR | Si | Single Tube | 20 | 6 | 30% | 12% | — | — | — | X Base Material Exposure |
| Comparative Example 4 | AFX | Si | Monolith | 20 | 6 | 30% | 12% | — | — | — | X Base Material Exposure |
| Comparative Example 5 | CHA | Si | Monolith | 20 | 6 | 33% | 20% | — | — | — | X Base Material Exposure |
| Comparative Example 6 | AEI | Al | Monolith | 20 | 6 | 40% | 21% | — | — | — | X Base Material Exposure |
| Comparative Example 7 | MFI | Si | Monolith | 20 | 6 | 31% | 18% | — | — | — | X Base Material Exposure |

By the same processing as that in Examples 1 to 9, the zeolite membrane complexes of Examples 10 to 13 are obtained by using the starting material solution for AFX-type zeolite membrane formation, the starting material solution for CHA-type zeolite membrane formation, the starting material solution for AEI-type zeolite membrane formation, and the starting material solution for MFI-type zeolite membrane formation. In Examples 10 to 13, the monolith-type support is used, and values of the starting material solution mass/membrane surface area and the temperature gradient of the starting material solution in the hydrothermal synthesis are shown in Table 1. In each of Examples 1 to 13, the temperature gradient of the starting material solution is within the range from 0.1 to 10° C./m.

By the same processing as that in Examples 1 to 13, the zeolite membrane complexes of Comparative Examples 1 to 7 are also obtained. In Comparative Examples 1 and 2 and Comparative Examples 4 to 7, the monolith-type support is used, and in Comparative Example 3, the cylindrical support is used. In the zeolite membrane complexes of Comparative Examples 1 to 7, the types of the zeolite membrane, values of the starting material solution mass/membrane surface area, and the temperature gradient of the starting material solution in the hydrothermal synthesis are shown in Table 1. In each of Comparative Examples 1 to 7, the temperature gradient of the starting material solution is out of the range from 0.1 to 10° C./m.

Subsequently, in the zeolite membrane complex having the monolith-type support, among the plurality of through holes arranged in the radial direction, selected are four through holes that are positioned inwardly from the outer-most one (see FIG. 3). The center distance between adjacent through holes is 5 mm. Then, at respective centers of the support upper portion, the support middle portion, and the support lower portion in the longitudinal direction, four measurement points are set on the respective inner peripheral surfaces of the four through holes, respectively. Further, in the zeolite membrane complex having the cylindrical support, at respective centers of the support upper portion, the support middle portion, and the support lower portion in the longitudinal direction, four measurement points are set on the outer peripheral surface of the support at regular angular intervals along the circumferential direction. The outer diameter of the cylindrical support is 11 mm.

Then, five measurements are performed at each measurement point, and the average value is determined as a value obtained at the measurement point. In the measurement of the concentration of the main element, the XPS apparatus (model name: ESCA-5600ci) manufactured by ULVAC-PHI, Inc. is used, and the measurement condition is that the X-ray source: monochromatic Al Kα ray (300 W), in combination with a neutralization gun, the analyzer aperture diameter: φ800 μm, and the charge correction: C1s, 284.8 eV. In the wide scan analysis, the scan energy: 0 to 1350 eV, the pass energy: 187.85 eV, and the cumulative time: 10 minutes. In the narrow scan analysis, the pass energy: 58.7 eV and the cumulative time: 4 minutes for each element. As to Si, the peak area intensity of Si2p is calculated.

After the measurements at all the measurement points of each zeolite membrane complex are finished, an overall evaluation value indicating the variation in the concentration of the main element at all the measurement points is obtained. In this case, the overall evaluation value is a value obtained in a manner in which among the concentrations of the main element at all the measurement points, a concentration having the maximum absolute value of a difference from the average value is specified, and the difference of the concentration (i.e., (the concentration−the average value)) is divided by the average value. Therefore, when the concentration having the maximum absolute value of the difference from the average value is lower than the average value, the overall evaluation value is a negative value. In Table 1, the overall evaluation value and a partial evaluation value described later are shown. In each of the zeolite membrane complexes of Examples 1 to 13, the absolute value of the overall evaluation value is 15% or less, and in each of the zeolite membrane complexes of Comparative Examples 1 to 7, the absolute value of the overall evaluation value is more than 15%.

Further, a partial evaluation value indicating the variation in the concentration of the main element of the zeolite membrane in the support middle portion is also obtained. In this case, the partial evaluation value is a value obtained in a manner in which among the concentrations of the main element at the measurement point group (four measurement points) of the support middle portion, a concentration having the maximum absolute value of a difference from the average value is specified, and the difference of the concentration (i.e., (the concentration−the average value)) is divided by the average value. Therefore, when the concentration having the maximum absolute value of the difference from the average value is lower than the average value, the partial evaluation value is a negative value. In each of the zeolite membrane complexes of Examples 1 to 13, the absolute value of the partial evaluation value is 10% or less, and in each of the zeolite membrane complexes of Comparative Examples 1 to 7, the absolute value of the partial evaluation value is more than 10%.

Furthermore, a concentration change of the main element in the longitudinal direction is obtained. In the zeolite membrane complex having the monolith-type support, three through holes are arbitrarily selected, and in each of the through holes, the respective ratios of the concentration of the main element in the support middle portion and that in the support lower portion to the concentration of the main element in the support upper portion are obtained. In Table 1, with respect to Examples 1, 2, and 9 and Comparative Example 1, shown is the ratio between the concentrations of the main element at the through hole in which the ratio between the concentrations of the main element in the support lower portion is smallest. In each of the zeolite membrane complexes of Examples 1, 2, and 9, the concentration of the main element gradually decreases in order of the support upper portion, the support middle portion, and the support lower portion, and in the zeolite membrane complex of Comparative Example 1, the concentration of the main element is lowest in the support middle portion. Further, in Examples 1, 2, and 9, the ratio of the concentration of the main element in the support lower portion to the concentration of the main element in the support upper portion is 0.90 or more.

Next, the defect staining test is performed on the zeolite membrane of each zeolite membrane complex. In the defect staining test, an aqueous solution containing 0.3 mass percentage of rhodamine B is brought into contact with a surface of the zeolite membrane. After the aqueous solution on the surface of the zeolite membrane is washed off with water, the zeolite membrane is dried. Then, the surface of the zeolite membrane is visually checked and observed with an optical microscope (320× magnification), and it is checked if staining is found in the zeolite membrane. In the column of "Defect Staining Test" of Table 1, the mark "○ (circle)" indicates that no staining is found in the zeolite membrane, and the mark "x (cross)" indicates that staining is found in the zeolite membrane.

Further, a portion of the zeolite membrane in which staining is found is observed with a SEM (scanning electron microscope), and the type of defect is thereby determined. In Table 1, "Crack" indicates that a crack occurs at the portion in which staining is found, and "Base Material Exposure" indicates that the portion of the zeolite membrane in which staining is found is chipped off and the support (base material) is exposed therefrom. In each of the zeolite membrane complexes of Examples 1 to 13, no staining is found in the zeolite membrane, and in each of the zeolite membrane complexes of Comparative Examples 1 to 7, staining is found in the zeolite membrane and a defect such as a crack or a base material exposure occurs.

Figure 9:
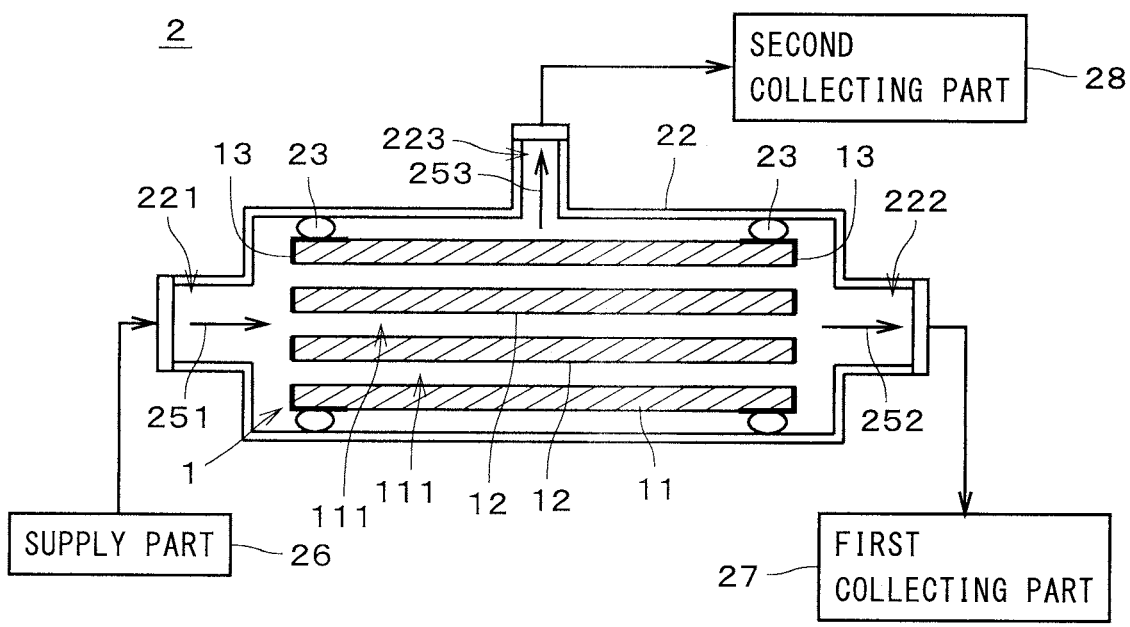
FIG. 9 is a diagram showing a separation apparatus.
Figure 10:
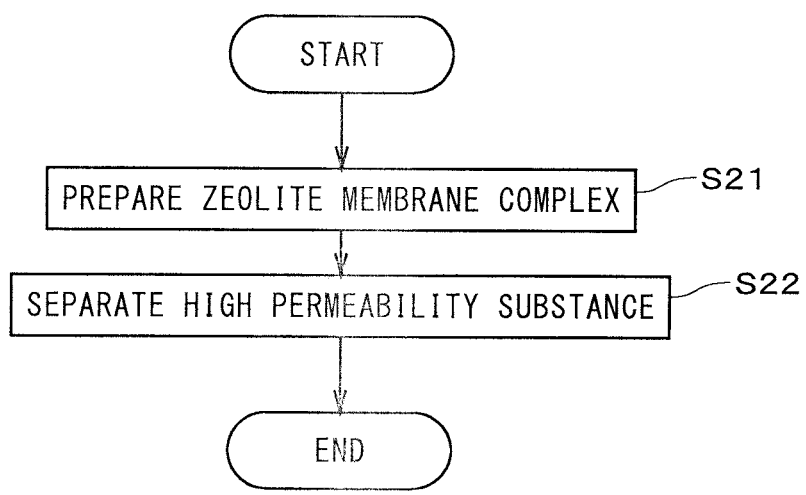
FIG. 10 is a flowchart showing a flow for separating a mixed substance by the separation apparatus.

Next, with reference to FIGS. 9 and 10, separation of a mixed substance using the zeolite membrane complex will be described. Though the zeolite membrane complex 1 shown in FIG. 1 is used in the following description, the same applies to the case where the zeolite membrane complex 1a shown in FIG. 5 is used. FIG. 9 is a diagram showing a separation apparatus 2. FIG. 10 is a flowchart showing a flow for separation of a mixed substance by the separation apparatus 2.

In the separation apparatus 2, a mixed substance containing a plurality of types of fluids (i.e., gases or liquids) is supplied to the zeolite membrane complex 1, and a substance with high permeability in the mixed substance is caused to permeate the zeolite membrane complex 1, to be thereby separated from the mixed substance. Separation in the separation apparatus 2 may be performed, for example, in order to extract a substance with high permeability from a mixed substance, or in order to concentrate a substance with low permeability.

The mixed substance (i.e., mixed fluid) may be a mixed gas containing a plurality of types of gases, may be a mixed liquid containing a plurality of types of liquids, or may be a gas-liquid two-phase fluid containing both a gas and a liquid.

The mixed substance contains at least one of, for example, hydrogen ($H_2$), helium (He), nitrogen ($N_2$), oxygen ($O_2$), water ($H_2O$), water vapor ($H_2O$), carbon monoxide (CO), carbon dioxide ($CO_2$), nitrogen oxide, ammonia ($NH_3$), sulfur oxide, hydrogen sulfide ($H_2S$), sulfur fluoride, mercury (Hg), arsine ($AsH_3$), hydrogen cyanide (HCN), carbonyl sulfide (COS), C1 to C8 hydrocarbons, organic acid, alcohol, mercaptans, ester, ether, ketone, and aldehyde.

The nitrogen oxide is a compound of nitrogen and oxygen. The above-described nitrogen oxide is, for example, a gas called NOx such as nitric oxide (NO), nitrogen dioxide ($NO_2$), nitrous oxide (also referred to as dinitrogen monoxide) ($N_2O$), dinitrogen trioxide ($N_2O_3$), dinitrogen tetroxide ($N_2O_4$), dinitrogen pentoxide ($N_2O_5$), or the like.

The sulfur oxide is a compound of sulfur and oxygen. The above-described sulfur oxide is, for example, a gas called $SO_X$ such as sulfur dioxide ($SO_2$), sulfur trioxide ($SO_3$), or the like.

The sulfur fluoride is a compound of fluorine and sulfur. The above-described sulfur fluoride is, for example, disulfur difluoride (F—S—S—F, S=$SF_2$), sulfur difluoride ($SF_2$), sulfur tetrafluoride ($SF_4$), sulfur hexafluoride ($SF_6$), disulfur decafluoride ($S_2F_{10}$), or the like.

The C1 to C8 hydrocarbons are hydrocarbons with not less than 1 and not more than 8 carbon atoms. The C3 to C8 hydrocarbons may be any one of a linear-chain compound, a side-chain compound, and a ring compound. Further, the C2 to C8 hydrocarbons may either be a saturated hydrocarbon (i.e., in which there is no double bond and triple bond in a molecule), or an unsaturated hydrocarbon (i.e., in which there is a double bond and/or a triple bond in a molecule). The C1 to C4 hydrocarbons are, for example, methane ($CH_4$), ethane ($C_2H_6$), ethylene ($C_2H_4$), propane ($C_3H_8$), propylene ($C_3H_6$), normal butane ($CH_3(CH_2)_2CH_3$), isobutane (CH $(CH_3)_3$), 1-butene ($CH_2$=$CHCH_2CH_3$), 2-butene ($CH_3CH$=$CHCH_3$), or isobutene ($CH_2$=$C(CH_3)_2$).

The above-described organic acid is carboxylic acid, sulfonic acid, or the like. The carboxylic acid is, for example, formic acid ($CH_2O_2$), acetic acid ($C_2H_4O_2$), oxalic acid ($C_2H_2O_4$), acrylic acid ($C_3H_4O_2$), benzoic acid ($C_6H_5COOH$), or the like. The sulfonic acid is, for example, ethanesulfonic acid ($C_2H_6O_3S$) or the like. The organic acid may either be a chain compound or a ring compound.

The above-described alcohol is, for example, methanol ($CH_3OH$), ethanol ($C_2H_5OH$), isopropanol (2-propanol) ($CH_3CH(OH)CH_3$), ethylene glycol ($CH_2(OH)CH_2(OH)$), butanol ($C_4H_9OH$), or the like.

The mercaptans are an organic compound having hydrogenated sulfur (SH) at the terminal end thereof, and are a substance also referred to as thiol or thioalcohol. The above-described mercaptans are, for example, methyl mercaptan ($CH_3SH$), ethylmercaptan ($C_2H_5SH$), 1-propanethiol ($C_3H_7SH$), or the like.

The above-described ester is, for example, formic acid ester, acetic acid ester, or the like.

The above-described ether is, for example, dimethyl ether (($CH_3)_2O$), methyl ethyl ether ($C_2H_5OCH_3$), diethyl ether (($C_2H_5)_2O$), or the like.

The above-described ketone is, for example, acetone (($CH_3)_2CO$), methyl ethyl ketone ($C_2H_5COCH_3$), diethyl ketone (($C_2H_5)_2CO$), or the like.

The above-described aldehyde is, for example, acetaldehyde ($CH_3CHO$), propionaldehyde ($C_2H_5CHO$), butanal (butylaldehyde) ($C_3H_7CHO$), or the like.

In the following description, it is assumed that the mixed substance separated by the separation apparatus 2 is a mixed gas containing a plurality of types of gases.

The separation apparatus 2 includes the zeolite membrane complex 1, a housing 22, two sealing members 23, a supply part 26, a first collecting part 27, and a second collecting part 28. The zeolite membrane complex 1 and the sealing members 23 are accommodated in the housing 22. The supply part 26, the first collecting part 27, and the second collecting part 28 are disposed outside the housing 22 and connected to the housing 22.

There is no particular limitation on the shape of the housing 22 but is, for example, a tubular member having a substantially cylindrical shape. The housing 22 is formed of, for example, stainless steel or carbon steel. The longitudinal direction of the housing 22 is substantially in parallel with the longitudinal direction of the zeolite membrane complex 1. A supply port 221 is provided at an end portion on one side in the longitudinal direction of the housing 22 (i.e., an end portion on the left side in FIG. 9), and a first exhaust port 222 is provided at another end portion on the other side. A second exhaust port 223 is provided on a side surface of the housing 22. The supply part 26 is connected to the supply port 221. The first collecting part 27 is connected to the first exhaust port 222. The second collecting part 28 is connected to the second exhaust port 223. An internal space of the housing 22 is a sealed space that is isolated from the space around the housing 22.

The two sealing members 23 are arranged around the entire circumference between an outer peripheral surface of the zeolite membrane complex 1 and an inner peripheral surface of the housing 22 in the vicinity of both end portions of the zeolite membrane complex 1 in the longitudinal direction. Each of the sealing members 23 is a substantially annular member formed of a material that gas cannot permeate. The sealing member 23 is, for example, an O-ring formed of a flexible resin. The sealing members 23 come into close contact with the outer peripheral surface of the zeolite membrane complex 1 and the inner peripheral surface of the housing 22 around the entire circumferences thereof. As described earlier, in the zeolite membrane complex 1, both the end surfaces of the support 11 in the longitudinal direction (i.e., in a left and right direction of FIG. 9) are covered with the sealing part 13. The sealing part 13 also covers part of the outer peripheral surface of the support 11 in the vicinity of both the end surfaces. In the exemplary case shown in FIG. 9, the sealing members 23 come into close contact with the sealing part 13 on the outer peripheral surface. The portions between the sealing members 23 and the outer peripheral surface of the zeolite membrane complex 1 and between the sealing members 23 and the inner peripheral surface of the housing 22 are sealed, and it is thereby mostly or completely impossible for gas to pass through the portions.

The supply part 26 supplies the mixed gas into the internal space of the housing 22 through the supply port 221. The supply part 26 is, for example, a blower or a pump for pumping the mixed gas toward the housing 22. The blower or the pump includes a pressure regulating part for regulating the pressure of the mixed gas to be supplied to the housing 22. The first collecting part 27 and the second collecting part 28 are each, for example, a storage container for storing the gas led out from the housing 22 or a blower or a pump for transporting the gas.

When separation of the mixed gas is performed, the above-described separation apparatus 2 is prepared to thereby prepare the zeolite membrane complex 1 (Step S21). Subsequently, the supply part 26 supplies a mixed gas containing a plurality of types of gases with different permeabilities for the zeolite membrane 12 into the internal space of the housing 22. For example, the main component of the mixed gas includes $CO_2$ and $CH_4$. The mixed gas may contain any gas other than $CO_2$ and $CH_4$. The pressure (i.e., introduction pressure) of the mixed gas to be supplied into the internal space of the housing 22 from the supply part 26 is, for example, 0.1 MPa to 20.0 MPa. The temperature for separation of the mixed gas is, for example, 10° C. to 150° C.

The mixed gas supplied from the supply part 26 into the housing 22 is introduced from the left end of the zeolite membrane complex 1 in the drawing into the inside of each through hole 111 of the support 11 as indicated by an arrow 251. Gas with high permeability (which is, for example, $CO_2$, and hereinafter is referred to as a "high permeability substance") in the mixed gas permeates the zeolite membrane 12 provided on the inner peripheral surface of each through hole 111 and the support 11, and is led out from the outer peripheral surface of the support 11. The high permeability substance is thereby separated from gas with low permeability (which is, for example, $CH_4$, and hereinafter is referred to as a "low permeability substance") in the mixed gas (Step S22). The gas (hereinafter, referred to as a "permeate substance") led out from the outer peripheral surface of the support 11 is collected by the second collecting part 28 through the second exhaust port 223 as indicated by an arrow 253. The pressure (i.e., permeation pressure) of the gas to be collected by the second collecting part 28 through the second exhaust port 223 is, for example, about 1 atmospheric pressure (0.101 MPa).

Further, in the mixed gas, gas (hereinafter, referred to as a "non-permeate substance") other than the gas which has permeated the zeolite membrane 12 and the support 11 passes through each through hole 111 of the support 11 from the left side to the right side in the drawing and is collected by the first collecting part 27 through the first exhaust port 222 as indicated by an arrow 252. The pressure of the gas to be collected by the first collecting part 27 through the first exhaust port 222 is, for example, substantially the same as the introduction pressure. The non-permeate substance may include a high permeability substance that has not permeated the zeolite membrane 12, as well as the above-described low permeability substance.

In the zeolite membrane complex 1 or 1a, the method of producing the zeolite membrane complex 1 or 1a, and the hydrothermal synthesis apparatus 6 described above, various modifications can be made.

Depending on the design of the zeolite membrane complex, the zeolite membrane 12 may be provided on the outer peripheral surface of the monolith-type support 11 shown in FIG. 1, or may be provided on the inner peripheral surface of the cylindrical support 11 shown in FIG. 5. In the zeolite membrane complex, the longitudinal support 11 having at least one through hole 111 extending in the longitudinal direction has only to be provided, and the zeolite membrane 12 has only to be formed over the inner peripheral surface of at least one through hole 111 in the support 11 or over the outer peripheral surface of the support 11, from one end portion of the support 11 in the longitudinal direction to the other end portion thereof.

Depending on the use of the zeolite membrane complex 1 or 1a, the zeolite membrane 12 may include the SDA. Specifically, in the production of the zeolite membrane 12, the process of removing the SDA (Step S14) may be omitted.

The zeolite membrane complex 1 or 1a may further include a function layer of a protective layer laminated on the zeolite membrane 12, additionally to the support 11 and the zeolite membrane 12. Such a function layer or a protective layer may be an inorganic membrane such as the zeolite membrane, a silica membrane, a carbon membrane, or the like or an organic membrane such as a polyimide membrane, a silicone membrane, or the like. Further, a substance that is easy to adsorb specific molecules such as $CO_2$ or the like may be added to the function layer or the protective layer laminated on the zeolite membrane 12.

In the separation apparatus 2 including the zeolite membrane complex 1 or 1a, any substance other than the substances exemplarily shown in the above description may be separated from the mixed substance.

In the hydrothermal synthesis apparatus 6, the zeolite membrane 12 may be formed on the support 11 having a shape other than a monolith-like shape or a cylindrical shape.

The configurations in the above-discussed preferred embodiment and variations may be combined as appropriate only if those do not conflict with one another.

While the invention has been shown and described in detail, the foregoing description is in all aspects illustrative and not restrictive. It is therefore understood that numerous modifications and variations can be devised without departing from the scope of the invention.

INDUSTRIAL APPLICABILITY

The zeolite membrane complex of the present invention can be used, for example, as a gas separation membrane, and can be further used in various fields, as a separation membrane for any substance other than gas, an adsorption membrane for various substances, or the like. The hydrothermal synthesis apparatus can be used for synthesizing various types of zeolite membranes.

REFERENCE SIGNS LIST 1, 1a Zeolite membrane complex
6 Hydrothermal synthesis apparatus
11 Support
12 Zeolite membrane
61 Reaction container
62 Heating part
111 Through hole
112 Outer peripheral surface (of support)
J1 Central axis (of support)
S11 to S14, S21, S22 Step

The invention claimed is:

1. A zeolite membrane complex, comprising:
a support which is a longitudinal member having a length of 50 cm or more and has at least one through hole extending in a longitudinal direction; and
a zeolite membrane provided over an inner peripheral surface of said at least one through hole in said support or over an outer peripheral surface of said support, from one end portion of said support in said longitudinal direction to the other end portion thereof,
wherein among constituent elements of said zeolite membrane except oxygen, an element with the highest percentage is assumed as a main element, and in a case where the concentration of said main element of said zeolite membrane is measured at three portions defined by dividing said support into three equal parts in said longitudinal direction, said concentration of said main element gradually decreases from a portion on said one end portion side toward a portion on said other end portion side, and the ratio of said concentration of said main element at said portion on said other end portion side to that at said portion on said one end portion side is 0.90 or more and 0.983 or less.

2. A zeolite membrane complex, comprising:
a support which is a longitudinal member having a length of 50 cm or more and has at least one through hole extending in a longitudinal direction; and
a zeolite membrane provided over an inner peripheral surface of said at least one through hole in said support or over an outer peripheral surface of said support, from one end portion of said support in said longitudinal direction to the other end portion thereof,
wherein among constituent elements of said zeolite membrane except oxygen, an element with the highest percentage is assumed as a main element, and in a case where the concentration of said main element of said zeolite membrane is measured at a plurality of measurement points including respective points on three portions defined by dividing said support into three equal parts in said longitudinal direction, among concentrations of said main element at said plurality of measurement points, a concentration having the maximum absolute value of a difference from an average value of all the concentrations is specified, and an overall evaluation value obtained by dividing the absolute value of the difference of said concentration from said average value by said average value is 3% or more and 15% or less.

3. The zeolite membrane complex according to claim 2, wherein
a plurality of through holes are provided in said support along a radial direction from a central axis extending in said longitudinal direction and said zeolite membrane is provided on inner peripheral surfaces of said plurality of through holes, and
two or more measurement points set on said inner peripheral surfaces of two or more through holes, respectively, at a predetermined position in said longitudinal direction among said plurality of through holes, are included in said plurality of measurement points.

4. The zeolite membrane complex according to claim 2, wherein
a single through hole extending in said longitudinal direction is provided in said support and said zeolite membrane is provided on said outer peripheral surface of said support, and
two or more measurement points set on said outer peripheral surface along a circumferential direction at a predetermined position in said longitudinal direction are included in said plurality of measurement points.

5. The zeolite membrane complex according to claim 3, wherein
among concentrations of said main element at said two or more measurement points, a concentration having the maximum absolute value of a difference from an average value of the concentrations is specified and a partial evaluation value obtained by dividing the absolute value of the difference of said concentration from said average value by said average value is 10% or less.

6. The zeolite membrane complex according to claim 1, wherein
the thickness of said zeolite membrane is not larger than 5 μm.

7. The zeolite membrane complex according to claim 2, wherein
the thickness of said zeolite membrane is not larger than 5 μm.

8. A method of producing a zeolite membrane complex according to claim 1, comprising:
a) preparing a longitudinal support having a length of 50 cm or more; and
b) forming a zeolite membrane on said support by immersing said support in a starting material solution for zeolite membrane formation and performing hydrothermal synthesis,
wherein while said starting material solution is heated at a predetermined synthesis temperature in said hydrothermal synthesis, the temperature gradient of said starting material solution between respective positions facing one side and the other side of said support in a longitudinal direction ranges from 0.1 to 10° C./m.

9. The method of producing a zeolite membrane complex according to claim 8, wherein
until said starting material solution is heated to said synthesis temperature in said hydrothermal synthesis, the temperature gradient of said starting material solution between said respective positions facing said one side and said other side of said support is not higher than 10° C./m.

10. The method of producing a zeolite membrane complex according to claim 8, wherein
the ratio of the mass of said starting material solution to the area of a region of said support in which said zeolite membrane is formed ranges from 1 to 15 kg/m$^2$.

11. The method of producing a zeolite membrane complex according to claim 8, wherein
said support is held so that said longitudinal direction is a substantially vertical direction in said hydrothermal synthesis.

12. A method of producing a zeolite membrane complex according to claim 2, comprising:
a) preparing a longitudinal support having a length of 50 cm or more; and
b) forming a zeolite membrane on said support by immersing said support in a starting material solution for zeolite membrane formation and performing hydrothermal synthesis,
wherein while said starting material solution is heated at a predetermined synthesis temperature in said hydrothermal synthesis, the temperature gradient of said starting material solution between respective positions facing one side and the other side of said support in a longitudinal direction ranges from 0.1 to 10° C./m.

13. The method of producing a zeolite membrane complex according to claim 12, wherein
until said starting material solution is heated to said synthesis temperature in said hydrothermal synthesis, the temperature gradient of said starting material solution between said respective positions facing said one side and said other side of said support is not higher than 10° C./m.

14. The method of producing a zeolite membrane complex according to claim 12, wherein
the ratio of the mass of said starting material solution to the area of a region of said support in which said zeolite membrane is formed ranges from 1 to 15 kg/m$^2$.

15. The method of producing a zeolite membrane complex according to claim 12, wherein
said support is held so that said longitudinal direction is a substantially vertical direction in said hydrothermal synthesis.

* * * * *